United States Patent
Hay et al.

(10) Patent No.: US 10,002,253 B2
(45) Date of Patent: *Jun. 19, 2018

(54) EXECUTION OF TEST INPUTS WITH APPLICATIONS IN COMPUTER SECURITY ASSESSMENT

(71) Applicant: International Business Machines Corporation, Armonk, NY (US)

(72) Inventors: Roee Hay, Haifa (IL); Sagi Kedmi, Raanana (IL); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 114 days.

This patent is subject to a terminal disclaimer.

(21) Appl. No.: 15/244,044

(22) Filed: Aug. 23, 2016

(65) Prior Publication Data

US 2017/0228544 A1 Aug. 10, 2017

Related U.S. Application Data

(63) Continuation of application No. 15/015,522, filed on Feb. 4, 2016, now Pat. No. 9,473,523.

(51) Int. Cl.
*G06F 21/57* (2013.01)
*G06F 11/36* (2006.01)

(52) U.S. Cl.
CPC ........ *G06F 21/577* (2013.01); *G06F 11/3668* (2013.01); *G06F 2221/033* (2013.01)

(58) Field of Classification Search
CPC ............... G06F 21/577; G06F 11/3668; G06F 2221/033
See application file for complete search history.

(56) References Cited

U.S. PATENT DOCUMENTS

| | | | |
|---|---|---|---|
| 8,572,574 B2 | 10/2013 | Ghosh et al. |
| 8,875,298 B2 | 10/2014 | Li et al. |
| 2005/0015752 A1 | 1/2005 | Alpern et al. |
| 2005/0066234 A1 | 3/2005 | Darringer et al. |
| 2005/0273860 A1 | 12/2005 | Chess et al. |

(Continued)

FOREIGN PATENT DOCUMENTS

WO WO2008131456 A1 10/2008

OTHER PUBLICATIONS

Thompson, et al., "Software Security Vulnerability Testing in Hostile Environments", Conference: Proceedings of the 2002 ACM Symposium on Applied Computing (SAC), Mar. 10-14, 2002, Madrid, Spain, pp. 260-264.

(Continued)

*Primary Examiner* — Darren B Schwartz
(74) *Attorney, Agent, or Firm* — Scully, Scott, Murphy & Presser, P.C.; Daniel P. Morris, Esq.

(57) ABSTRACT

A given application is instrumented to trace its execution flow. Constraints and/or transformation associated with input identified in the execution flow are mirrored on a set of candidate test payloads. The set of candidate test payloads are modified or pruned based on the execution flow of the instrumented application reaching a security operation with the input satisfying the constraints while the payloads may not. If the set of candidate test payloads is not empty at reaching the security operation, it is determined that the give application has vulnerability and a signal issuing a warning may be generated and transmitted.

20 Claims, 6 Drawing Sheets

(56) References Cited

U.S. PATENT DOCUMENTS

| | | |
|---|---|---|
| 2006/0021052 A1 | 1/2006 | D'Mello et al. |
| 2006/0277539 A1 | 12/2006 | Amarasinghe et al. |
| 2006/0277606 A1 | 12/2006 | Yunus et al. |
| 2008/0209567 A1 | 8/2008 | Lockhart et al. |
| 2008/0320328 A1 | 12/2008 | O'Leary |
| 2009/0119647 A1 | 5/2009 | Kim et al. |
| 2009/0125976 A1 | 5/2009 | Wassermann et al. |
| 2011/0126288 A1 | 5/2011 | Schloegel et al. |
| 2013/0086689 A1 | 4/2013 | Laverdiere-Papineau |
| 2014/0157420 A1 | 6/2014 | Guamieri et al. |
| 2014/0373159 A1 | 12/2014 | Guamieri et al. |
| 2015/0033346 A1 | 1/2015 | Hebert et al. |
| 2015/0106943 A1 | 4/2015 | Tripp et al. |
| 2015/0128281 A1 | 5/2015 | Muthurajan et al. |
| 2015/0264074 A1 | 9/2015 | Mendelev et al. |
| 2015/0373042 A1 | 12/2015 | Tripp et al. |

OTHER PUBLICATIONS

List of IBM Patents or Patent Applications Treated as Related, dated Aug. 23, 2016, 2 pages.

EXECUTION OF TEST INPUTS WITH APPLICATIONS IN COMPUTER SECURITY ASSESSMENT

CROSS-REFERENCE TO RELATED APPLICATIONS

This application is a continuation of U.S. patent application Ser. No. 15/015,522, filed Feb. 4, 2016, the entire content and disclosure of which is incorporated herein by reference.

FIELD

The present application relates generally to computers and computer applications, and more particularly to computer security.

BACKGROUND

Modern platforms, and in particular cloud, mobile and web technologies, are all subject to security threats, as they are exposed to unexpected interactions with other software (e.g., other mobile apps on the same device or other cloud services on the same cluster) as well as open access by users (e.g., website visits from all over the world). At the same time, the scale and complexity of modern software systems complicate both manual and automated forms of security auditing.

Manual auditing is prohibitive, as current software systems typically consist of millions of lines of code. These often include third-party libraries as well as platform code. Moreover, beyond the core software, there are external configuration files, databases, web services, and the like. Reasoning about all the possible security-relevant execution scenarios, and analyzing the threats due to each of these scenarios and the correctness and completeness of the defenses installed in response to the involved threats, is hardly a tractable task for a manual auditor.

The same holds true for static verification tools. These are challenged by the scale of the system, which mandates approximate rather than fully precise analysis, leading in turn to an excess of false warnings. Added to that is the problem of accounting for external resources, which static analysis is typically not aware of.

Further, static analyses are unable to analyze dynamically generated code, which is characteristic of client-side JavaScript, web frameworks as well as evasive mobile apps that utilize dynamic code loading for IP protection purposes.

Moreover, dynamic testing tools are faced with the difficult task of deciding which test inputs to attempt. Brute-force enumeration of all possible payloads is prohibitive and unacceptable, whereas focused testing using only a small subset of all available payloads results in poor coverage, and often also nondeterminism if the choice of payloads to fire is probabilistic.

BRIEF SUMMARY

A method and system of computer security checking may be provided. The method, in one aspect, may include generating an initial set of candidate test payloads. The method may also include identifying candidate program points within a given application. The method may further include instrumenting the given application to generate an instrumented application. The method may also include executing the instrumented application and tracking execution of the instrumented application. The method may also include, responsive to determining that the instrumented application is receiving an input, binding the input to the initial set of candidate test payloads. The method may further include, at execution points of the instrumented application where the input is constrained, applying a same constraint applied to the input to a payload in the initial set of candidate test payloads. The method may also include, at execution points of the instrumented application where the input is transformed, applying a same transformation to the payload in the initial set of candidate test payloads. The method may also include, responsive to determining that the input satisfies a constraint in the execution points of the instrumented application where the input is constrained but the payload does not, removing the payload from the initial set of candidate test payloads. The method may also include, responsive to determining that the execution of the instrumented application reached a security operation, determining whether the initial set of candidate test payloads is empty. The method may also include, responsive to determining that the initial set of candidate test payloads is not empty, establishing that vulnerability has been detected in the given application. The method may further include generating a signal to issue a warning.

A system for computer security checking, in one aspect, may include a memory device and one or more hardware processors coupled to the memory device. One or more of the hardware processors may be operable to generate an initial set of candidate test payloads. One or more of the hardware processors may be further operable to identify candidate program points within a given application. One or more of the hardware processors may be further operable to instrument the given application to generate an instrumented application. One or more of the hardware processors may be further operable to execute the instrumented application and tracking execution of the instrumented application. Responsive to determining that the instrumented application is receiving an input, one or more of the hardware processors may be further operable to bind the input to the initial set of candidate test payloads and store a mapping of the input and the initial set of candidate test payloads on the memory device. One or more of the hardware processors, in reaching execution points of the instrumented application where the input is constrained, may be further operable to apply a same constraint applied to the input to a payload in the initial set of candidate test payloads. One or more of the hardware processors, in reaching execution points of the instrumented application where the input is transformed, may be further operable to apply same transformation to the payload in the initial set of candidate test payloads. Responsive to determining that the input satisfies a constraint in the execution points of the instrumented application where the input is constrained but the payload does not, one or more of the hardware processors may be further operable to remove the payload from the initial set of candidate test payloads. Responsive to determining that the execution of the instrumented application reached a security operation, one or more of the hardware processors may be further operable to determine whether the initial set of candidate test payloads is empty. Responsive to determining that the initial set of candidate test payloads is not empty, one or more of the hardware processors may be further operable to establish that vulnerability has been detected in the given application and generate a signal to issue a warning.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

A system, method and techniques are disclosed that address the problem of computer software security checking, which combats the inherent complexities of modern code, thereby for example achieving high coverage while also ensuring high efficiency. The methodology in one embodiment of the present disclosure monitors user interactions with a subject system (one or more computers or hardware processors executing a given application) passively, without directly injecting malicious data into it, which enables a deep and complete view into the business logic and functionality of the system. At the same time, constraints (e.g., checks performed or placed on user input by the given application) and transformations (e.g., transformation performed on the user input by the given application) on user inputs are collected and mirrored on a set of candidate testing payloads. The candidate testing payloads are pruned (per collected constraints) and manipulated (per collected transformations) to reflect their hypothetical state at respective execution points had they (malicious data) been injected. If a designated security-sensitive operation is reached in the execution of the subject system with a non-empty set of viable payloads (i.e., ones that have not turned benign due to transformations), then security vulnerability has been detected. The methodology of the present disclosure may operate on mobile device applications, e.g., mobile apps, web applications, and other computer applications.

A payload may include any input data, for example, designed for the purpose of testing a given application. A payload in computer security may include data, for example, as part of computer malware, that performs a malicious or damaging action on the computer and/or a harmful result produced on the computer by such malicious action. Examples of such payloads include data destruction, messages with malicious text or spurious e-mail messages sent to a large number of people, a security token, and a script. As an example, a payload may be in the form of a hypertext description or instruction and/or have a grammar structure.

Figure 1:
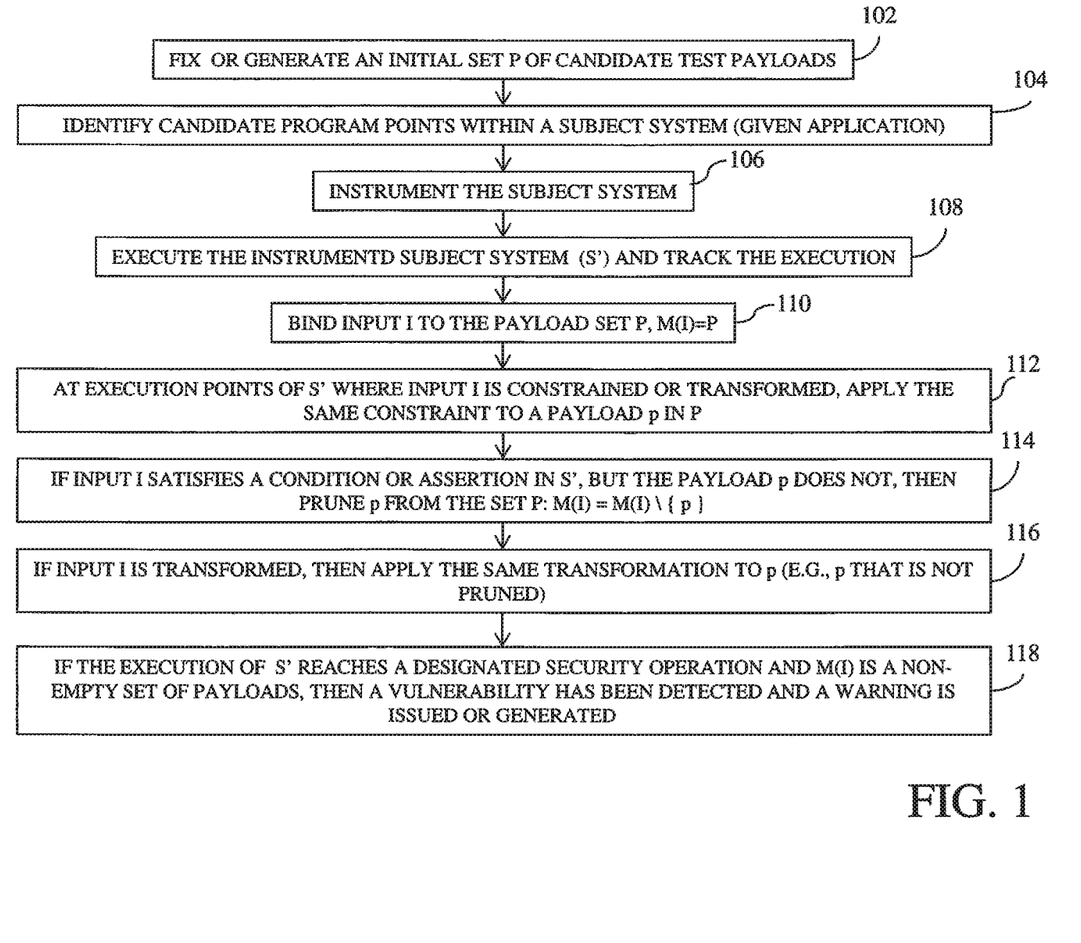
FIG. 1 is a flow diagram illustrating a method of a present disclosure in one embodiment.

FIG. 1 is a flow diagram illustrating a method of a present disclosure in one embodiment. The methodology of the present disclosure in one embodiment provides the ability to perform dynamic security testing based, for example, only on a benign payload. A payload is benign if it does not produce a harmful result. Benign payload produces intended functionality in a given application. Conversely, malicious payload produces unintended functionality in a given application. Payloads may be discharged by a remote agent over a network or another communication mechanism such as Inter-Processor Communication (IPC) on a mobile device, e.g., a mobile phone or another device. Independent agents or controllers may communicate among one another. The methodology of the present disclosure in one embodiment may use a benign payload and derive a filter on candidate payloads by encoding the execution path as a set of constraints. The set of constraints may be derived from benign inputs. In one aspect, the methodology of the present disclosure in one embodiment may obviate the need for multiple checks with respect to an arbitrary input by starting from a benign input and recording the execution path it induces.

At 102, an initial set P of candidate test payloads is fixed or established. For example, a set of payloads may be retrieved from a security database that stores a collection of security payloads that are determined to have security risks, for example, if executed or used on a computer.

At 104, candidate program points are identified within a subject system Sys (a given application) into which input data may flow. These candidate program points may include, in particular, conditions and assertions (to collect constraints) in the code or program statements of the subject system Sys and statements in the subject system Sys that manipulate the input (to collect transformations). Condition statement, e.g., may include 'if' statements or the like in the program code. Assertion statements may include 'assert' statements or the like or comments that make assertions, e.g., assumption that a predicate or a Boolean-valued function is a true expression. Statements that manipulate the input may include any program code statements that access or use the input data. Security-sensitive operations (referred to as Sen) in the code, i.e., the subject system Sys may be also instrumented to detect when and/or how those security-sensitive operations are used.

For instance, the processing of identifying candidate program points at 104 may be accomplished by applying static analysis to the subject system Sys to detect the candidate points. Identifying candidate program points at 104 also may be done by utilizing domain knowledge, e.g., by instrumenting string APIs that retrieve target or requested string values, and other common ways of manipulating inputs.

At 106, the subject system Sys is instrumented according to the candidate program points of interest, for example, as identified at 104. Instrumenting incorporates code tracing, for example, to monitor or measure the level of performance and/or diagnose errors in a running application (application run-time), and may include inserting program code statements, instructions, or APIs or the like into the program code, e.g., to write trace information. The instrumented system Sys is referred to as I-Sys. The instrumented I-Sys may be stored in a memory or storage device. In one embodiment, security-sensitive operations (referred to as Sen) in the code, i.e., the subject system Sys are instrumented.

At 108, the execution of I-Sys on a computer hardware processor are tracked and/or monitored, e.g., across quality assurance (QA) and user sessions. The methodology of the present disclosure in one embodiment may perform dynamic analysis over an instrumented version of the program or application.

At 110, responsive to determining that a user-provided input I is read into the system I-Sys, the methodology of the present disclosure in one embodiment binds the input I to the complete set P of candidate payloads. These mappings (bound input I with set P) are stored in a map M in a memory or storage device, such that initially M(I)=P.

At 112, at instrumentation points exercised dynamically (at runtime of the application), where user input I is constrained or transformed, the methodology of the present disclosure applies the same constraints and/or transformation applied to input I by the instrumented system I-Sys (the given application that is instrumented) to the payload p in P:

At 114, if the input I satisfies a condition or assertion in the instrumented system I-Sys (e.g., constraint), but the payload p does not, then p is pruned out of the set P: M(I)=M(I)\{p}. For instance, payload p that does not satisfy the given application's constraint (e.g., condition or assertion or the like) would be considered as an uninteresting candidate for testing since it would not be able to penetrate the given application as the given application would already filter payload based on its constraint.

At 116, if the input I is transformed, then the same transformation is applied to the payload p. For instance, consider that the input is of type string, which may be normally the case. Then modification of the string via concatenation or trimming is mirrored on p. The processing at 112-114 are performed in one embodiment for all payload p's in the set P.

At 118, if a statement in Sen in the execution of I-Sys is reached with data emanating from user input I (e.g., the user input I has been processed (met constraints and/or was transformed by being traversed through the runtime of the instrumented application) and reached this point in execution), and M(I) is a non-empty set of payloads, then a vulnerability has been detected and a warning is issued. For instance, it is established that vulnerability is detected in the subject system S (a given application) and a signal issuing a warning may be generated. A non-empty set of payloads M(I) indicates that a payload satisfied a condition or an assertion in the system I-Sys and hence the payload was able to penetrate through the application and may pose a possible risk.

In comparison with black-box and glass-box testing tools, which inject payloads into the subject system and track its concrete behavior to validate whether a vulnerability has occurred, the methodology of the present disclosure in one embodiment provide a benefit that the business logic is properly and exhaustively exercised. This is because benign inputs, rather than test inputs are driving the system's behavior. The problem with the latter is that they are often treated as invalid, and so testing suffers from poor coverage. It is also infeasible to concretely try out all the possible test payloads, which the methodology of the present disclosure in one embodiment bypasses by mirroring constraints and transformations on benign inputs over the entire set of test payloads. The methodology of the present disclosure in one embodiment is agnostic to an attack vector, as constraints are tracked per the benign input flowing through the system. Existing testing tools, in contrast, have to devise specialized payloads for different attack types, which constrains coverage and complicates the testing process.

The methodology of the present disclosure in one embodiment has an advantage of accounting for constraints and transformations on the input before a determination is made whether a vulnerability condition has occurred. Refraining from this level of reasoning has been shown to result in many false alarms, due to the fact that though there is data flow between the input point and security-sensitive operation, the value reaching the sensitive operation is benign as validated by checks along the execution path and guaranteed by transformations on it.

Figure 2:
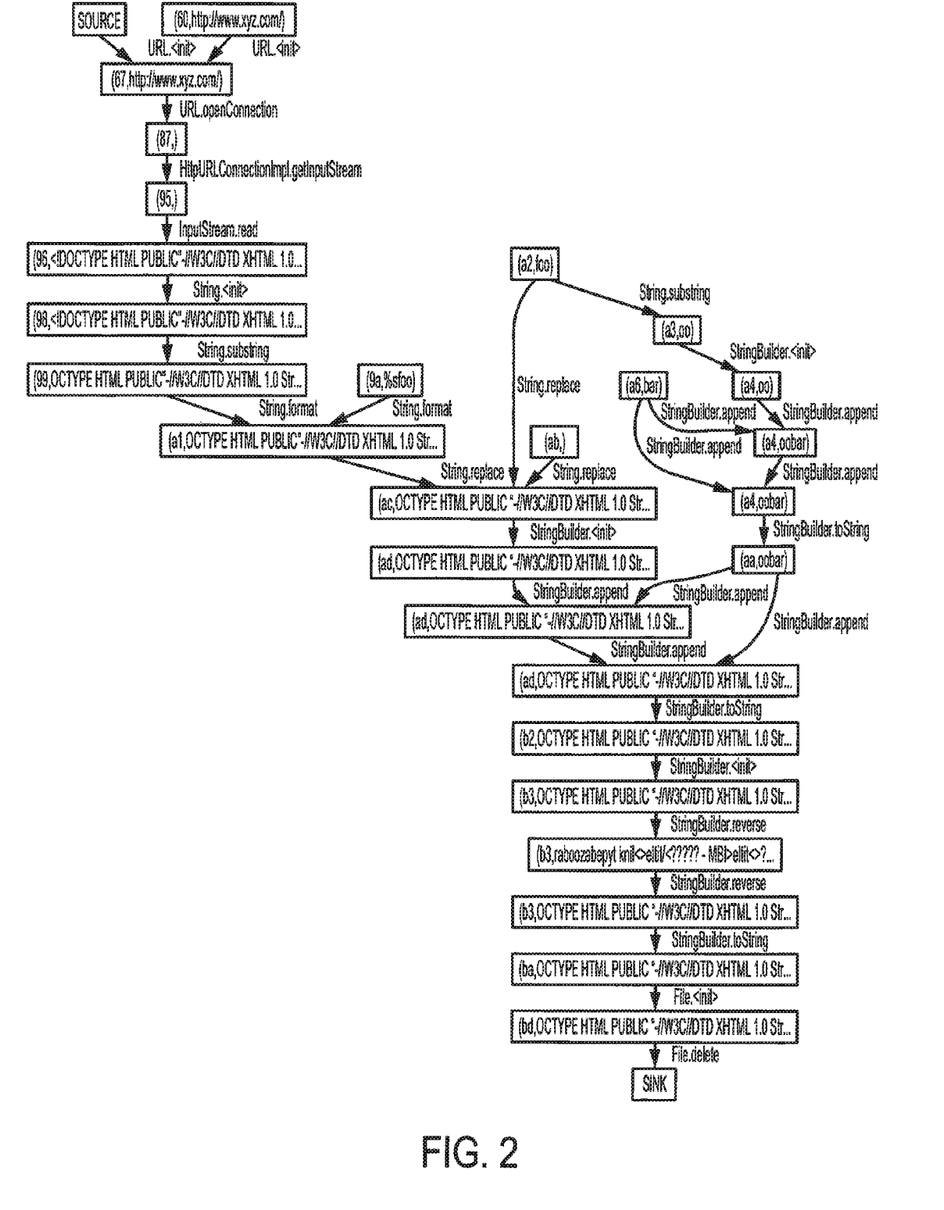
FIG. 2 a graph showing tracking a flow of benign inputs through a computer code and identifying usage and manipulation points for the inputs.

The methodology of the present disclosure in one embodiment is able to track flow of benign inputs through the code and identify usage and manipulation points for these inputs. This is illustrated in the graph shown in FIG. 2. The graph's corresponding code is shown below:

```
@Override
protected void onCreate(Bundle savedInstanceState) {
super.onCreate(savedInstanceState);
task1 = new MyTask1( ).execute( );
task2 = new MyTask2( ).execute( );
}
public class MyTask1 extends AsyncTask<String, Void, Void> {
@Override
protected Void doInBackground(String... params) {
try {
byte[ ] buffer = new byte[1024];
URL url = new URL("http://www.ibm.com/"); // SRC
URLConnection conn = url.openConnection( );
InputStream input = conn.geInputStream( );
input.read(buffer);
String a = new String(buffer);
Log.d("TASK1", a);
String b = a.substring(3);
String c = b;
String d = String.format("%sfoo", c);
String e = "foo".substring(1) + "bar";
String f = d.replace("foo", "baz") + e;
String h = new
StringBuilder(f).reverse( ).reverse( ).toString( );
filename = h;
synchronized(this)
{
Log.d("TASK1", "Notifying");
notifyAll( );
}
} catch (MalformedURLException ex) {
}
catch (IOException e1) {
// TODO Auto-generated catch block
e1.printStackTrace( );
}
return null;
}
}
public class MyTask2 extends AsyncTask<String, Void, Void> {
@Override
protected Void doInBackground(String... params) {
synchronized (task1)
{
if (null == filename)
{
try {
Log.d("TASK2", "Waiting..");
if (null == filename)
task1.wait( );
Log.d("TASK2", "Notified!");
} catch (InterruptedException e) {
e.printStackTrace( );
}
}
}
Log.d("TASK2", "Deleting file..");
new File(filename).delete( ); // SINK
return null;
}
}
```

Figure 3:
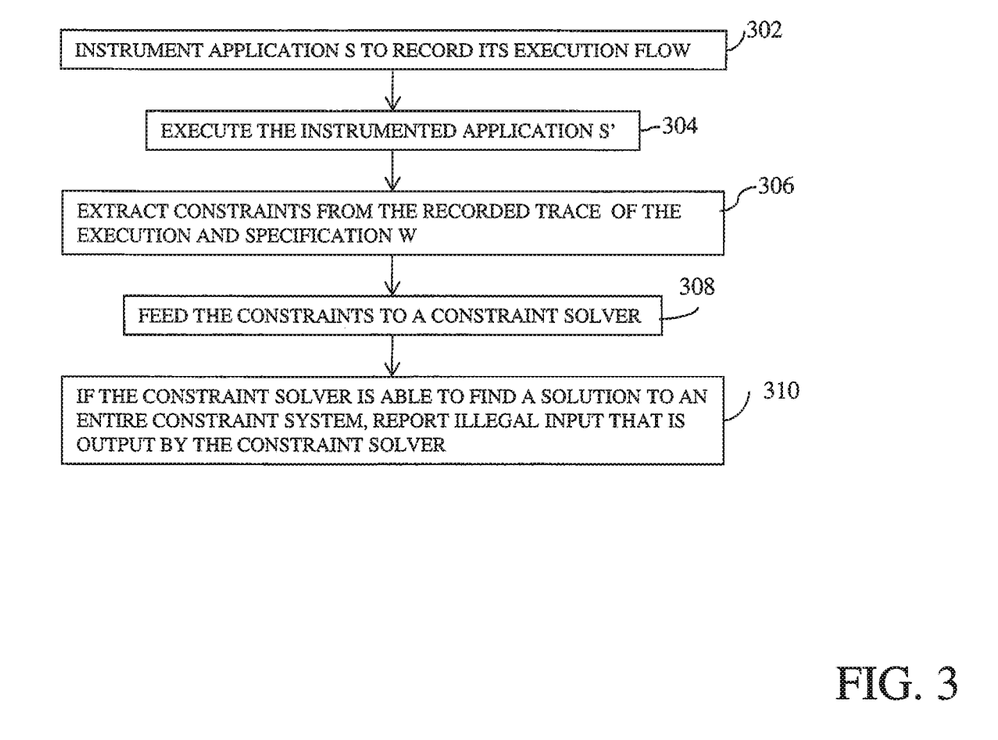
FIG. 3 is another flow diagram illustrating a method of the present disclosure in one embodiment.

FIG. 3 is another flow diagram illustrating a method of the present disclosure in one embodiment. Inputs to the method may include an application S (e.g., software application), e.g., a program code of S, input I, e.g., input data received by the software application S, and specification W specifying what constitutes and illegal input. At 302, application S is instrumented to record its execution flow. Instrumented application S is referred to as S', for explanation purpose. At 304, the instrumented application S' is executed on one or more computers or hardware processors with the input I. The instrumented application S outputs and records or stores the trace of its execution, e.g., as it executes.

At 306, constraints are extracted from the recorded trace and the specification W to verify whether the same trace can be repeated with an illegal input. Specification W specifies what constitutes and illegal (or legal) input in the application S, for example, those that are outside, above or below a given threshold, meet or not meet the constraints of the application. Examples may include a range of values for an input, the type of data, e.g., number or digit data that can be converted to an integer or floating point value, alphabet data, and/or others. Specification W specifies what may be interesting for testing.

At 308, the constraints that are extracted are fed to a constraint solver. For instance, the input traverses the application (as it is executed) and the application execution reaches a security-sensitive or security-critical operation (also referred to above as Sen) in the application. At this point, the checks, constraints and transformations in the application code performed on the input have been collected. The constraint solver takes the collected information (e.g., constraints and transformations) and all the payloads in a list of payloads and determines a payload in the list that satisfies the collected constraints or checks. The constraint solver removes from the list of payloads, one or more payloads that do not satisfy those constraints. For the remaining payload, the constraint solver applies the collected transformations (if any). The constraint solver determines whether the payload, e.g., after the transformation has been applied, are illegal inputs based on the specification in W. Those one or more payloads determined to be illegal inputs based on the specification in W are selected as security test payloads.

At 310, if the constraint solver is able to find a solution to the entire constraint system, illegal input that is output by the constraint solver is reported, for example, to the user.

Figure 4:
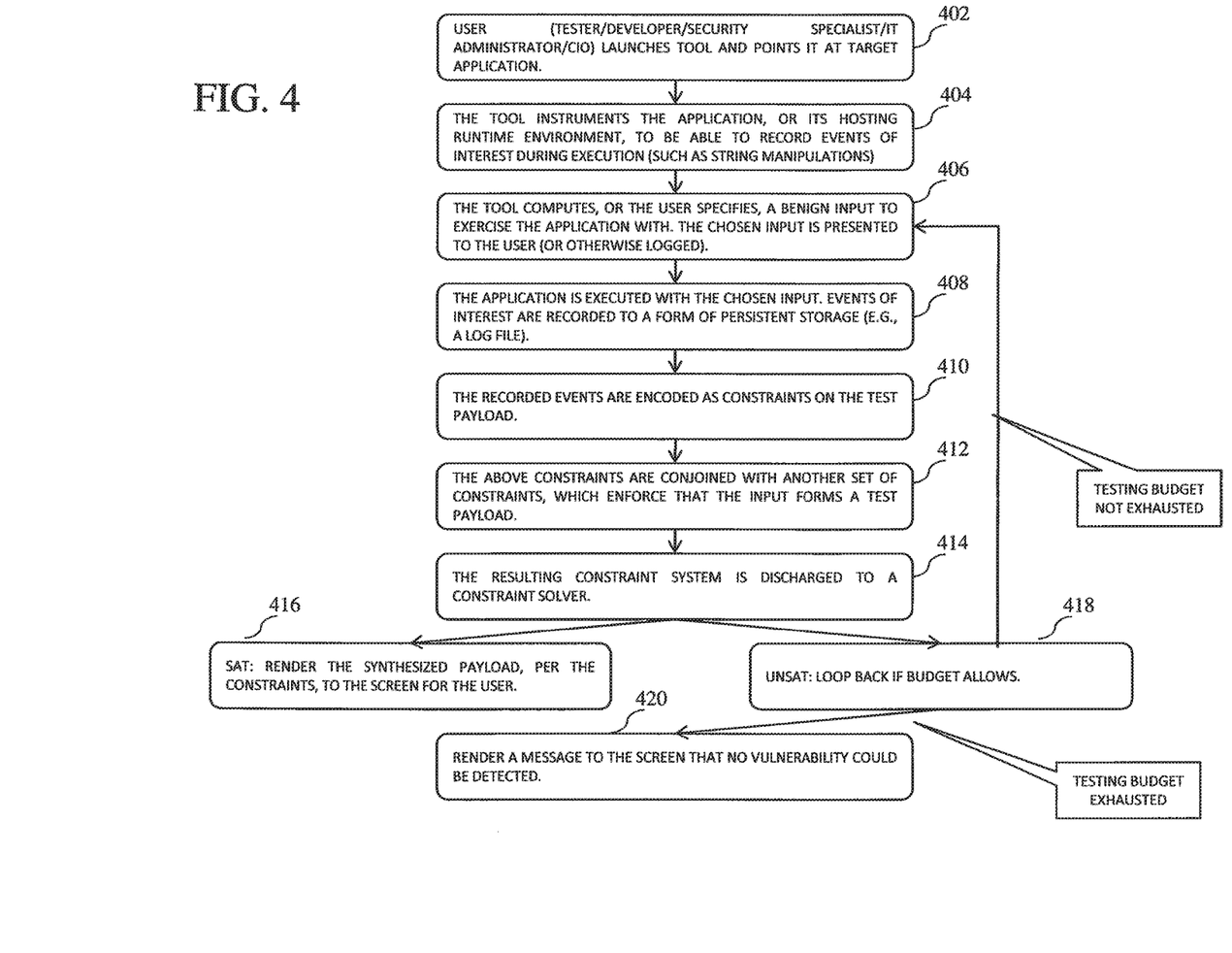
FIG. 4 is another flow diagram illustrating a method of the present disclosure in one embodiment.

FIG. 4 is another flow diagram illustrating a method of the present disclosure in one embodiment. At 402, a user may launch a tool and reference a target application. At 404, the tool instruments the application, or its hosting runtime environment, to be able to record events of interest during execution such as string manipulations. At 406, the tool computes, or the user specifies, a benign input to exercise the application with. The chosen input is presented to the user or otherwise logged. At 408, the application is executed with the chosen input. Events of interest are recorded to a form of persistent storage, e.g., a log file. At 410, the recorded events are encoded as constraints on the test payload. At 412, the constraints are conjoined with another set of constraints, which enforce that the input forms a test payload. At 414, the resulting constraint system is discharged to a constraint solver. At 416, the synthesized payload may be rendered, per the constraints, to a display screen, for example, for the user to view, for instance, in the case that the constraint solver detected vulnerability. At 418, if no vulnerability is detected, for instance, based on the available testing budge, the processing may return to 406 to repeat the process. At 420, for example, if a testing budge is exhausted, a message may be rendered that no vulnerability could be detected.

Figure 5:
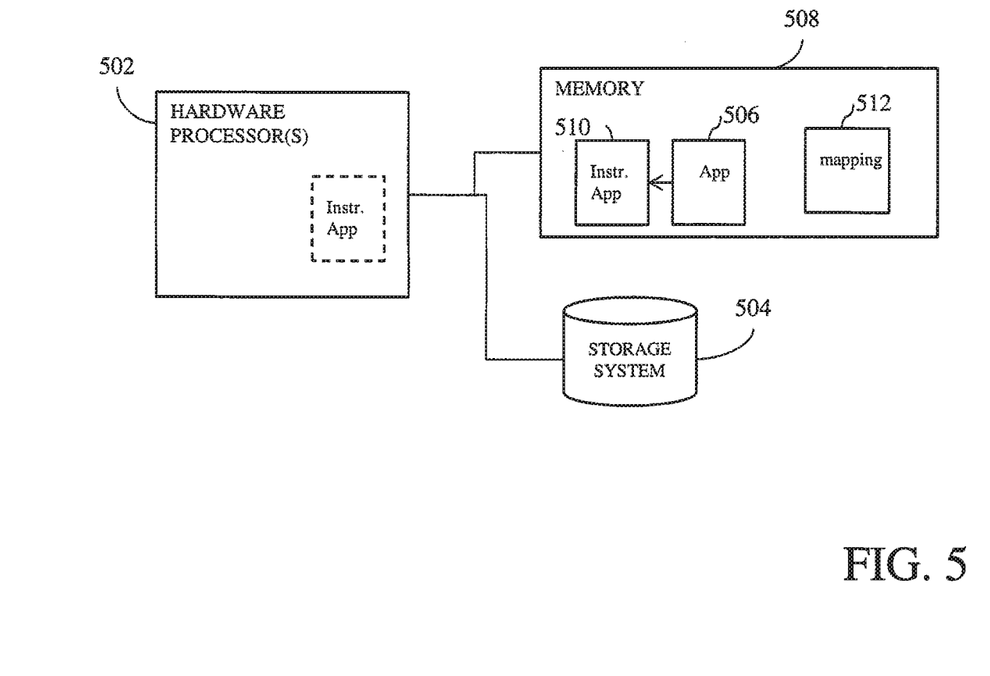
FIG. 5 illustrates a diagram showing components of a system in one embodiment of the present disclosure.

FIG. 5 illustrates a diagram showing components of a system in one embodiment of the present disclosure. One or more hardware processors 502 generates an initial set of candidate test payloads, for example, from a payload data, e.g., which may be stored in a storage system 504. One or more of the hardware processors 502 identifies candidate program points within a given application 506, for example, which may be stored in a memory device 508, and instruments the given application 506 to generate an instrumented application 510. One or more of the hardware processors 502 executes the instrumented application 510 and tracks execution of the instrumented application. Responsive to determining that the instrumented application 510 is receiving an input, one or more of the hardware processors 520 binds the input to the initial set of candidate test payloads and store a mapping 512 of the input and the initial set of candidate test payloads, e.g., on the memory device 508. One or more of the hardware processors 502, in reaching execution points of the instrumented application where the input is constrained, applies the input to a payload in the initial set of candidate test payloads. One or more of the hardware processors 502, in reaching execution points of the instrumented application where the input is transformed, may apply the same transformation to the payload in the initial set of candidate test payloads. Responsive to determining that the input satisfies a constraint in the execution points of the instrumented application where the input is constrained, one or more of the hardware processors 502 removes the payload from the initial set of candidate test payloads. Responsive to determining that the execution of the instrumented application reached a security operation, one or more of the hardware processors 502 determines whether the initial set of candidate test payloads is empty. Responsive to determining that the initial set of candidate test payloads is not empty, one or more of the hardware processors 502 may establish that vulnerability has been detected in the given application 506 and generate a signal to issue a warning. In one aspect, the given application 506 may be a mobile device application.

Figure 6:
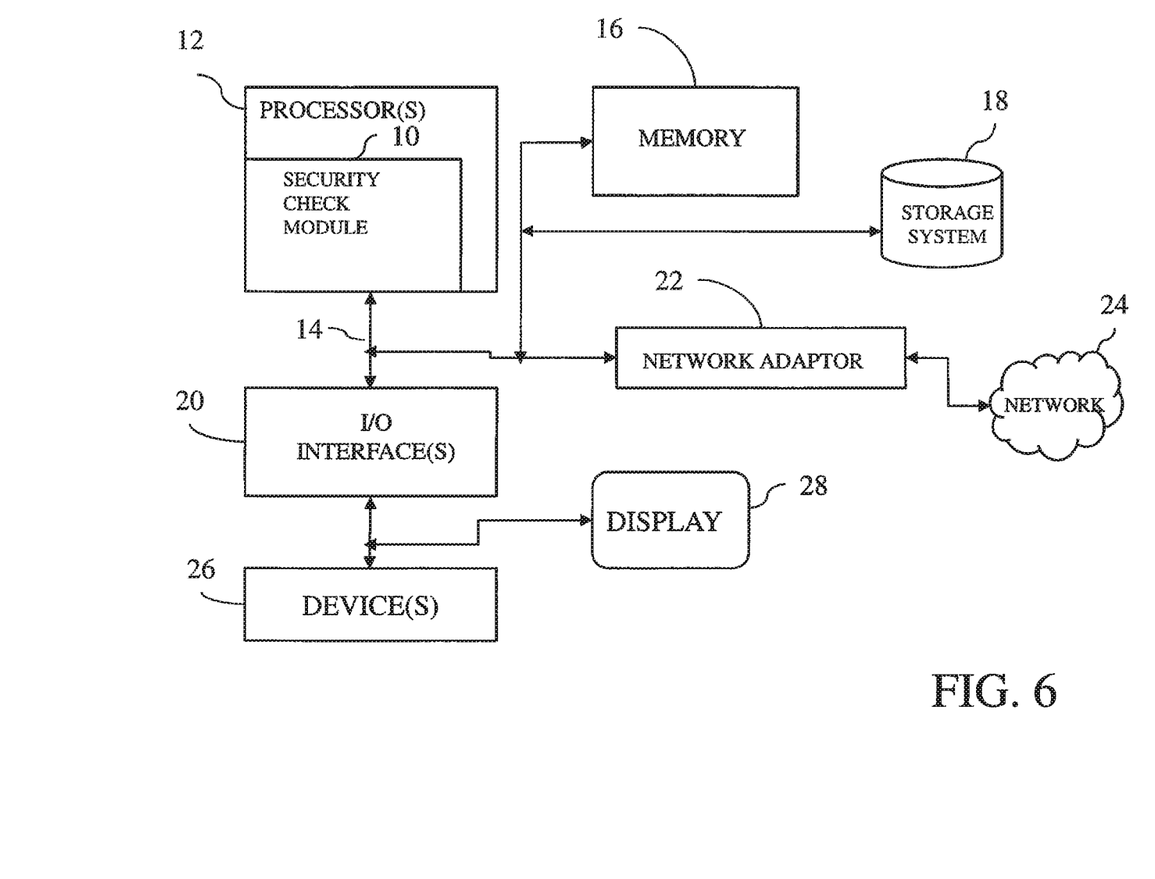
FIG. 6 illustrates a schematic of an example computer or processing system that may implement a security checking system in one embodiment of the present disclosure.

FIG. 6 illustrates a schematic of an example computer or processing system that may implement a security checking system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a security check module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of computer security checking, comprising:
generating an initial set of candidate test payloads;
identifying candidate program points within a given application;
instrumenting the given application to generate an instrumented application;
executing the instrumented application on a computer processor and tracking execution of the instrumented application;
responsive to determining that the instrumented application is receiving an input, binding the input to the initial set of candidate test payloads;
at execution points of the instrumented application where the input is constrained via at least one constraint, applying the at least one constraint applied to the input to a payload in the initial set of candidate test payloads;
responsive to determining that the input satisfies a constraint in the execution points of the instrumented application where the input is constrained but the payload does not constrain the input, removing the payload from the initial set of candidate test payloads;
responsive to determining that the execution of the instrumented application reached a security operation, determining whether the initial set of candidate test payloads is empty;
responsive to determining that the initial set of candidate test payloads is not empty, establishing that a vulnerability has been detected in the given application; and
generating a signal to issue a warning on the computer processor executing the application,
wherein at least the tracking execution of the instrumented application and the binding the input to the initial set of candidate test payload, are performed automatically during application runtime of the instrumented application.

2. The method of claim 1, wherein the given application comprises a mobile device application.

3. The method of claim 1, wherein the candidate program points are identified according to a static analysis of the given application.

4. The method of claim 1, wherein the candidate program points are identified utilizing domain knowledge and instrumenting one or more string application programming interfaces.

5. The method of claim 1, wherein the candidate program points comprise points of execution that include one or more of condition and assertion.

6. The method of claim 1, wherein the security operation in the instrumented application is instrumented.

7. The method of claim 1, wherein the constraint comprises one or more of a condition and assertion in the instrumented application.

8. A computer readable storage medium storing a program of instructions executable by a machine to perform a method of computer security checking, comprising:
- generating an initial set of candidate test payloads;
- identifying candidate program points within a given application;
- instrumenting the given application to generate an instrumented application;
- executing the instrumented application on a computer processor and tracking execution of the instrumented application;
- responsive to determining that the instrumented application is receiving an input, binding the input to the initial set of candidate test payloads;
- at execution points of the instrumented application where the input is constrained via at least one constraint, applying the at least one constraint applied to the input to a payload in the initial set of candidate test payloads;
- responsive to determining that the input satisfies a constraint in the execution points of the instrumented application where the input is constrained but the payload does not constrain the input, removing the payload from the initial set of candidate test payloads;
- responsive to determining that the execution of the instrumented application reached a security operation, determining whether the initial set of candidate test payloads is empty;
- responsive to determining that the initial set of candidate test payloads is not empty, establishing that a vulnerability has been detected in the given application; and
- generating a signal to issue a warning on the computer processor executing the application,
- wherein at least the tracking execution of the instrumented application and the binding the input to the initial set of candidate test payload, are performed automatically during application runtime of the instrumented application.

9. The computer readable storage medium of claim 8, wherein the given application comprises a mobile device application.

10. The computer readable storage medium of claim 8, wherein the candidate program points are identified according to a static analysis of the given application.

11. The computer readable storage medium of claim 8, wherein the candidate program points are identified utilizing domain knowledge and instrumenting one or more string application programming interfaces.

12. The computer readable storage medium of claim 8, wherein the candidate program points comprise points of execution that include one or more of condition and assertion.

13. The computer readable storage medium of claim 8, wherein the security operation in the instrumented application is instrumented.

14. The computer readable storage medium of claim 8, wherein the constraint comprises one or more of a condition and assertion in the instrumented application.

15. A system for computer security checking, comprising:
- a memory device;
- at least one hardware processor coupled to the memory device,
- the at least one hardware processor operable to generate an initial set of candidate test payloads,
- the at least one hardware processor further operable to identify candidate program points within a given application,
- the at least one hardware processor further operable to instrument the given application to generate an instrumented application,
- the at least one hardware processor further operable to execute the instrumented application and tracking execution of the instrumented application,
- responsive to determining that the instrumented application is receiving an input, the at least one hardware processor further operable to bind the input to the initial set of candidate test payloads and store a mapping of the input and the initial set of candidate test payloads on the memory device,
- the at least one hardware processor, in reaching execution points of the instrumented application where the input is constrained via at least one constraint, further operable to apply the at least one constraint applied to the input to a payload in the initial set of candidate test payloads,
- responsive to determining that the input satisfies a constraint in the execution points of the instrumented application where the input is constrained but the payload does not constrain the input, the at least one hardware processor further operable to remove the payload from the initial set of candidate test payloads;
- responsive to determining that the execution of the instrumented application reached a security operation, the at least one hardware processor further operable to determine whether the initial set of candidate test payloads is empty,
- responsive to determining that the initial set of candidate test payloads is not empty, the at least one hardware processor further operable to establish that vulnerability has been detected in the given application and generate a signal to issue a warning,
- wherein the at least one hardware processor performs at least the tracking execution of the instrumented application and binding the input to the initial set of candidate test payload, automatically during application runtime of the instrumented application.

16. The system of claim 15, wherein the given application comprises a mobile device application.

17. The system of claim 15, wherein the candidate program points are identified according to a static analysis of the given application.

18. The system of claim 15, wherein the candidate program points are identified utilizing domain knowledge and instrumenting at least one string application programming interface.

19. The system of claim 15, wherein the candidate program points comprise points of execution that include at least one of condition and assertion.

20. The system of claim 15, wherein the security operation in the instrumented application is instrumented.

* * * * *